(12) United States Patent
Kuo et al.

(10) Patent No.: US 8,041,912 B2
(45) Date of Patent: Oct. 18, 2011

(54) MEMORY DEVICES WITH DATA PROTECTION

(75) Inventors: Yu-Lan Kuo, Hsinchu (TW); Chun-Yi Lee, Hsinchu (TW); Kuen-Long Chang, Taipei (TW); Chun-Hsiung Hung, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 888 days.

(21) Appl. No.: 11/863,254

(22) Filed: Sep. 28, 2007

(65) Prior Publication Data

US 2009/0089526 A1 Apr. 2, 2009

(51) Int. Cl.
*G06F 12/00* (2006.01)

(52) U.S. Cl. .................. 711/163; 711/E12.069
(58) Field of Classification Search .................. 711/163
See application file for complete search history.

(56) References Cited

U.S. PATENT DOCUMENTS 6,026,016 A * 2/2000 Gafken .................. 365/185.04
6,446,179 B2 * 9/2002 Baltar .......................... 711/163

FOREIGN PATENT DOCUMENTS

CN 1496517 5/2004
CN 1534492 10/2004

OTHER PUBLICATIONS

"1st Office Action of China Counterpart Application", issued on Jun. 24, 2010, p1-p10, in which the listed references were cited.

* cited by examiner

*Primary Examiner* — Reginald Bragdon
*Assistant Examiner* — Hamdy Ahmed
(74) *Attorney, Agent, or Firm* — Jianq Chyun IP Office

(57) ABSTRACT

A memory device comprises a memory array, a status register coupled with the memory array, and a security register coupled with the memory array and the status register. The memory array contains a number of memory blocks configured to have independent access control. The status register includes at least one protection bit indicative of a write-protection status of at least one corresponding block of the memory blocks that corresponds to the protection bit. The security register includes at least one register-protection bit. The register-protection bit is programmable to a memory-protection state for preventing a state change of at least the protection bit of the status register. The register-protection bit is configured to remain in the memory-protection state until the resetting of the memory device.

12 Claims, 5 Drawing Sheets

| Block Protect Bits | | | | Memory Level | |
|---|---|---|---|---|---|
| BP3 | BP2 | BP1 | BP0 | Protected blocks | |
| 0 | 0 | 0 | 0 | 0 (none) | |
| 0 | 0 | 0 | 1 | 1 (1block, block 31st) | ← Top 1 block |
| 0 | 0 | 1 | 0 | 2 (2blocks, block 30th-31st) | ← Top 2 blocks |
| 0 | 0 | 1 | 1 | 3 (4blocks, block 28th-31st) | ← Top 4 blocks |
| 0 | 1 | 0 | 0 | 4 (8blocks, block 24th-31st) | ← Top 8 blocks |
| 0 | 1 | 0 | 1 | 5 (16blocks, block 16th-31st) | ← Top 16 blocks |
| 0 | 1 | 1 | 0 | 6 (32blocks, all) | |
| 0 | 1 | 1 | 1 | 7 (32blocks, all) | |
| 1 | 0 | 0 | 0 | 8 (32blocks, all) | |
| 1 | 0 | 0 | 1 | 9 (32blocks, all) | |
| 1 | 0 | 1 | 0 | 10 (32blocks, all) | |
| 1 | 0 | 1 | 1 | 11 (32blocks, all) | |
| 1 | 1 | 0 | 0 | 12 (32blocks, all) | |
| 1 | 1 | 1 | 0 | 13 (32blocks, all) | |
| 1 | 1 | 1 | 1 | 14 (32blocks, all) | |

| Status bit | | | | Protect Level | |
|---|---|---|---|---|---|
| BP3 | BP2 | BP1 | BP0 | 16Mb | |
| 0 | 0 | 0 | 0 | 0(none) | |
| 0 | 0 | 0 | 1 | 1(1block, block 31st) | Top 1 block |
| 0 | 0 | 1 | 0 | 2(2blocks, block 30th-31st) | Top 2 blocks |
| 0 | 0 | 1 | 1 | 3(4blocks, block 28th-31st) | Top 4 blocks |
| 0 | 1 | 0 | 0 | 4(8blocks, block 24th-31st) | Top 8 blocks |
| 0 | 1 | 0 | 1 | 5(16blocks, block 16th-31st) | Top 16 blocks |
| 0 | 1 | 1 | 0 | 6(32blocks, all) | |
| 0 | 1 | 1 | 1 | 7(32blocks, all) | |
| 1 | 0 | 0 | 0 | 8(32blocks, all) | |
| 1 | 0 | 0 | 1 | 9(32blocks, all) | |
| 1 | 0 | 1 | 0 | 10(16blocks, block 0th-15th) | Bottom 16 blocks |
| 1 | 0 | 1 | 1 | 11(24blocks, block 0th-23rd) | Bottom 24 blocks |
| 1 | 1 | 0 | 0 | 12(28blocks, block 0th-27th) | Bottom 28 blocks |
| 1 | 1 | 0 | 1 | 13(30blocks, block 0th-29th) | Bottom 30 blocks |

Fig. 5

MEMORY DEVICES WITH DATA PROTECTION

TECHNICAL FIELD

This application relates generally to memory devices and more particularly relates to the data protection of nonvolatile memory devices.

BACKGROUND

Nonvolatile memories use a variety of memory cell designs. Examples of nonvolatile memories include read only memory, flash memory, etc. A nonvolatile memory device may be accessed by a central processor unit (CPU) or other devices or processors for various purposes during the operation of a computer system. The term "access" includes read, write, erase and rewrite execution commands to the nonvolatile memory device. Nonvolatile memories can retain the stored information without being erased even in the absence of power supply. In other words, once electrically programmed, the nonvolatile memory may retain the stored data until it is electrically erased. In addition, data stored in the nonvolatile memory may be changed at any time when the power supply is resumed. One of the many applications for nonvolatile memories include serving as storage media in digital cameras, music players, cellular phones, etc. and serving as system memories in computing systems, personal digital assistants (PDAs), phones, etc.

Without limiting the scope of invention, the use of a nonvolatile memory as a BIOS memory in a computing system is illustrated below. In order for a computer system to operate properly, its operating system needs to be properly configured to communicate with the computer system's hardware devices. Basic Input Output System (BIOS) codes or other boot codes are typically the codes used for such configuration. To retain the codes without the need of power supply, the BIOS codes are typically stored in a nonvolatile memory device on the motherboard of a computer system.

As illustrative examples, a BIOS memory may have various sizes and configurations, such as 16 Megabits (MB) or 32 MB. A BIOS memory may include a set of contiguous memory blocks. Depending on its applications and design, a typical memory block granularity or unit may be 64 KB. And a 16 MB BIOS memory may therefore have 32 memory blocks. BIOS memories may be used to store many types of information, such as critical boot codes, peripheral "plug and play" data, unique serial number of a computer system, etc. If information stored in BIOS memory is improperly altered or overwritten, the computer system may not function properly. Therefore, there may be a need for protecting data in a BIOS memory or other nonvolatile memory devices to ensure the data is protected from improper alteration or deletion.

BRIEF SUMMARY

In various embodiments of the invention, a memory device includes a register-protection bit for locking a protection area until a resetting of the memory device.

In one embodiment, a memory device may include a memory array, a status register, and a security register. The memory array contains a number of memory blocks configured to have independent access control. The status register may be coupled with the memory array and may include at least one protection bit indicative of a protection status of at least one corresponding block of the memory blocks that corresponds to the protection bit. The security register may be coupled with the memory array and the status register. The security register may include at least one register-protection bit and the protection bit may be programmable to a memory-protection state for preventing a state change of the protection bit of the status register. The register-protection bit is configured to remain in the memory-protection state until a resetting of the memory device.

In another embodiment, a memory device may include a memory array and a security register. The memory array has a number of memory blocks configured to have independent access control. The security register may be coupled with the memory array and may include at least one register-protection bit. The register-protection bit may be programmable to a memory-protection state for preventing at least one of the memory blocks from being written. The register-protection bit is configured to remain in the memory-protection state until a resetting of the memory device.

In still another embodiment, a memory device may include a memory array, a status register, and a security register. The memory array contains a number of memory blocks. The status register may be coupled with the memory array and may include at least one protection bit indicative of a protection status of at least one corresponding block of the memory blocks that corresponds to the protection bit. The security register may be coupled with the memory array and the status register and include at least one register-protection bit. The register-protection bit is programmable to a memory-protection state for preventing a state change of at least the protection bit of the status register.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 is an exemplary diagram illustrating various memory blocks and a protection area of a memory array consistent with embodiments of the invention;

FIG. 5 is an exemplary diagram illustrating various memory blocks and a protected area of a memory device consistent with embodiments of the invention.

DETAILED DESCRIPTION

Figure 1:
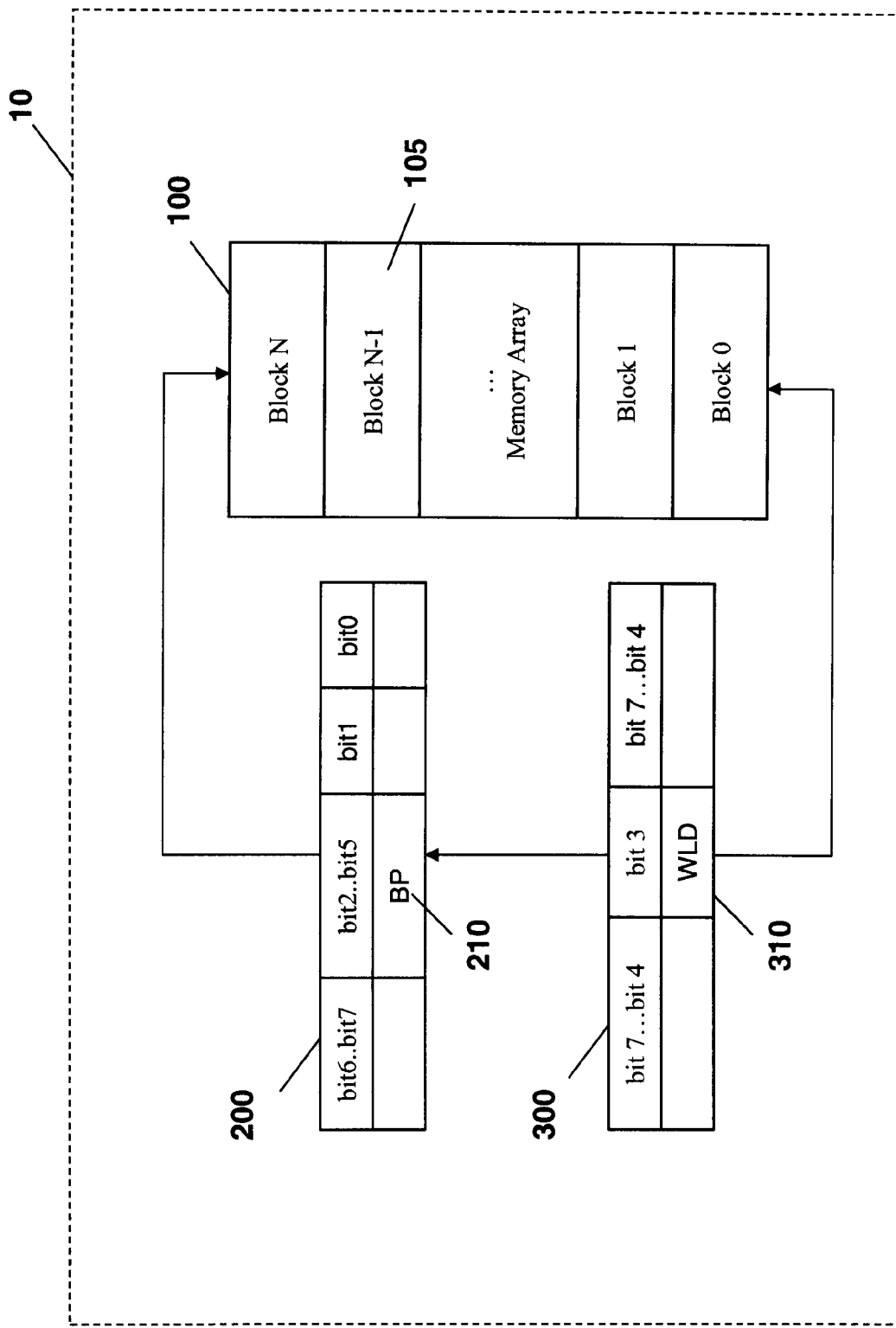
FIG. 1 is a block diagram of an exemplary memory device consistent with embodiments of the invention.

Reference will now be made in detail to the invention and the presently preferred embodiments thereof, examples of which are illustrated in the accompanying drawings. Wherever possible, the same or similar reference numbers are used in the drawings and the description to refer to the same or like parts.

Embodiments of a memory device may include a register-protection bit for preventing the memory device or some areas of the memory device from being written intentionally or accidentally. The register-protection bit may be configured to remain in a register protection state until a reset or a power-off and power-on event of the memory device.

FIG. 1 is a block diagram illustrating an embodiment of a memory device 10. The memory device 10 includes a memory array 100 containing a number of memory blocks 105. Each memory block 105 may be configured to have independent access control, e.g. write accessibility or read accessibility. In one embodiment, the memory device 10 may include a status register 200 coupled with the memory array 100 and a security register 300 coupled with the memory array 100 as well as the status register 200. Status register 200 may include one or more protection bits. In one embodiment, a block-protect bit is served as the protection bit. Block-protect bit(s) 210 of the status register 200 may indicate a write-protection status of the memory blocks 105. In other words, the size of the protection area of the memory array 100 may be defined to protect against access based on the values of the block-protect bits 210.

FIG. 2 illustrates an example of the protection area of the memory array. Referring to FIG. 2, when the values of the block-protect bits 210 equal to 0010, the top two memory blocks, i.e. the $30^{th}$ memory block and the $31^{st}$ memory block are prevented from being written. Similarly, when block-protect bits 210 equal to 0101, top 16 memory blocks that include the $16^{th}$ memory block through the $31^{st}$ memory block are defined as a protection area.

Figure 3:
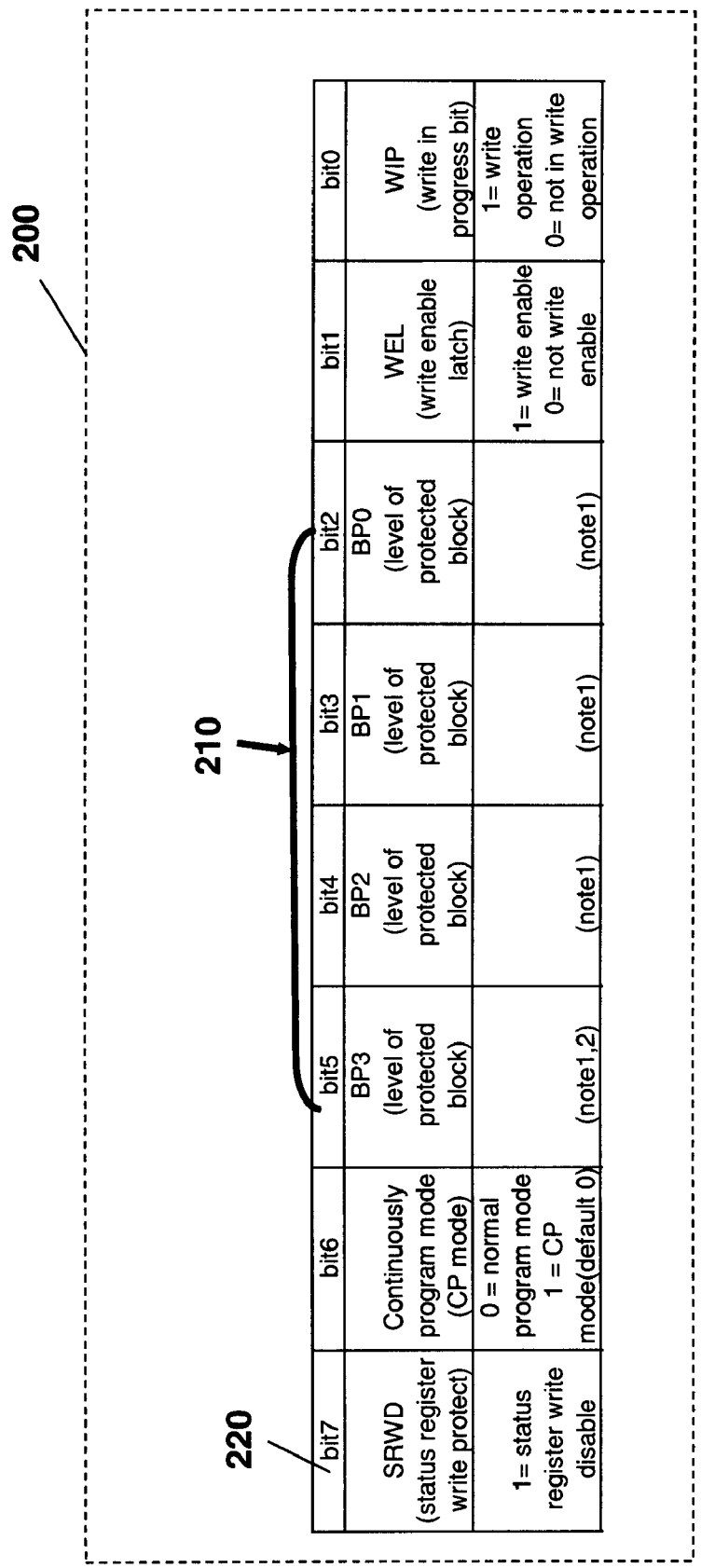
FIG. 3 is an exemplary diagram illustrating status registers of a memory device consistent with embodiments of the invention.

In some embodiments, the state change of block-protect bits 210 may be decided by a status-register write-protect bit 220 of the status register 200 as illustrated in FIG. 3. The status-register write-protect bit 220 is defined to enable or disable "write" to the status register 200. When the status-register write-protect bit 220 is disabled, the status register 200 may be prevented from being written or erased. Thus the block-protect bits 210 contained in the status register 200 is protected against the update. In one embodiment, the status-register write-protect bit 220 may work in connection with a write protect pin (not shown) of the memory device 10 for providing various protection modes. When the status-register write-protect bit 220 is low, no matter what the state of the write protection pin is, the status register 200 can be accessed by executing some instruction commands. Accordingly, the contents stored in the status register 200, which includes the block-protect bits 210, may be rewritten by executing some instruction commands. However, in some other embodiments, once the status-register write-protect bit 220 is set, the accessibility of the status register 200 depends on the write protect pin. The values of the status register 200 may be modified when the write protect pin is high. In contrast, any attempted changes to the status register 200 is rejected when the write protect pin is low, allowing the protection area be locked.

Figure 4:
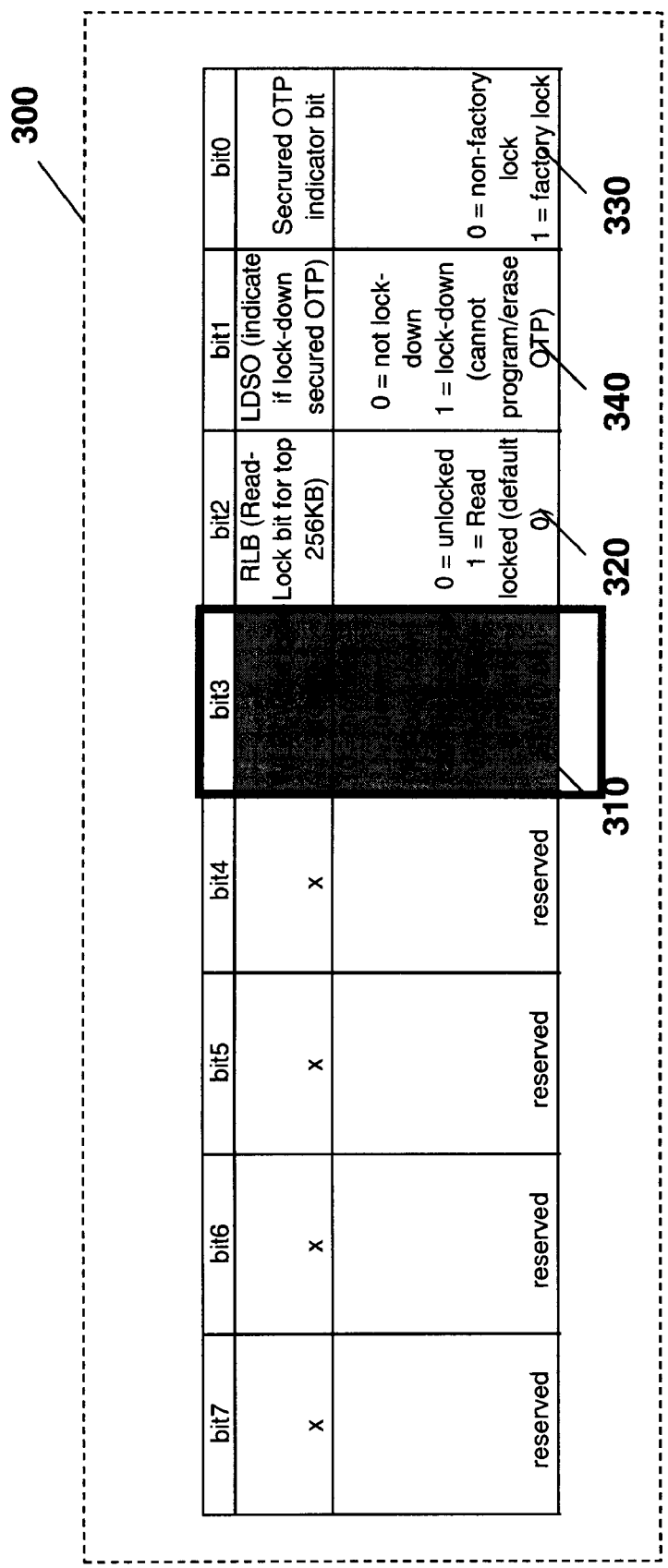
FIG. 4 is an exemplary diagram illustrating a security register of a memory device consistent with embodiments of the invention.

However, since the state of the status-register write-protect bit 220 can be changed at any time during the computer system power-on, the status-register write-protect bit 220 may be modified by accident in some instances, which may result in the change of the contents stored in the protection area. In some other embodiments, a register-protection bit of the security register 300 may provide an additional mechanism to prevent the protection area of the memory array 100 from being changed. In this embodiment, a write lock-down bit 310 is served as a register-protection bit as shown in FIG. 4. Once the write down lock bit 310 is set to a register protection state, any operations that attempt to change the block-protect bits 210 and the status-register write-protect bit 220 are prevented. Accordingly, a "write" to the memory blocks that corresponds to the block-protect bits 210 is be locked until the write lock-down bit 310 is cleared. Though the write lock-down bit 310 seems to function in a similar way as the status-register write-protect bit 220, i.e. protect the block-protect bits 210 against unexpected change, they may differ in how the block-protect bits 210 are unlocked. As an example, the state change of the status-register write-protect bit 220 may be performed by executing instructions while the write lock-down bit 310 may be cleared by a resetting of the memory device 10. This distinction may effectively avoid malicious or unintentional alteration to the protection area of the memory array 100 when the computer system is powered on. In some embodiments, the resetting of the memory device 10 may include a reset event, a power-off and power-on event or other signal events that may make the memory device 10 re-enter the initial state.

Some data stored in the memory array may need to be protected from being read. For example, it may desirable to restrict access to a user's password stored in the memory device. A read-lock bit 320 contained by the security register 300 may be defined to provide the protection in one embodiment. When the read-lock bit 320 is programmed to a read-protection state, the read operation of the corresponding memory blocks 105 is ignored or rejected. In some embodiments, the protection area that corresponds to the read-lock bit 320 may be included in a write protection area. For example, two memory blocks, the $29^{th}$ memory block and the $30^{th}$ memory block, may be prevented from being read by setting the read-lock bit 320 to a read-protection state. However, according to the block-protect bits 210, the $28^{th}$ through the $31^{st}$ memory blocks may be defined as a write protection area. Since both read and write restrictions are applied to the $29^{th}$ memory block and the $30^{th}$ memory block, these two memory blocks are unlocked to be read and may in a write protection area. Therefore, the $28^{th}$ through the $31^{st}$ memory blocks are all prevented from being written. The read-lock bit 320, like the write lock-down bit 310, may prevent maliciously or unintentionally alteration to the read status of a read protection area. The state change of the read-lock bit 320 may not be updated or modified by executing instructions, i.e. the state change may not be performed when the computer system is powered on. The read-lock bit 320, however, may be cleared by a resetting of the memory device 10. In some embodiments, the resetting of the memory device 10 may include a reset event, a power-off and power-on event or other signal events that may make the memory device 10 re-enter the initial state.

Embodiments of the memory device may include a one-time programmable area as a secured area for setting specific information of the memory device. For example, a serial number of the device. This type of information may not be updated or accessed once it is locked. In this embodiment, the security register 300 includes a security indicator bit 330 for indicating a status of the one-time programmable area. The security indicator bit 330 may be set to indicate a manufacturer-originated lock of the one-time programmable area. The security register 300 may also include a security protection bit 340. Once the security protection bit 340 is set, the secured, one-time programmable area and the indicator lock bit 340 can not be accessed any more.

Generally, the protection area of the memory array 100 may be selected through the $n^{th}$ memory block to the top most memory block (n is a positive number) of the memory array 100 during the access operations. Referring to FIG. 5, for example, memory blocks 28 though 32 or memory blocks 24 though 32 may be defined as protection areas. Thus, the access operations to the memory blocks are executed on one or more top most contiguous memory blocks. However, in some embodiments of the present invention, the memory blocks set as a protection area may include bottom-most or top-most contiguous memory blocks. As illustrated in FIG. 5, if the block-protect bits 210 are set to 1010, bottom-most memory blocks 0 through 15 are defined as a protection area. Similarly, bottom-most memory blocks 0 through 23 are under protection if the value of the block-protect bits 210 equal to 1011. The selection of the bottom-most contiguous memory blocks may provide more selections of the protection area.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A memory device comprising:
   a memory array containing a number of memory blocks, the memory blocks being configured to have independent access control;
   a status register coupled with the memory array, the status register including at least one protection bit indicative of a write-protection status of at least one corresponding block of the memory blocks that corresponds to the protection bit;
   a status-register write-protect bit coupled with the status register for preventing a state change of the at least one protection bit; and
   a security register coupled with the memory array and the status register, the security register including at least one register-protection bit, the register-protection bit being programmable to a memory-protection state for preventing the state change in one of the status-register write-protect bit and the at least one protection bit of the status register, wherein the register-protection bit is configured to remain in the memory-protection state until a resetting of the memory device.

2. The memory device of claim 1, wherein the status-register write-protect bit is included in the status register to prevent a register change of the status register.

3. The memory device of claim 1, wherein the status register comprises at least one block-protect bit to serve as the at least one protection bit.

4. The memory device of claim 1, wherein the security register comprises at least one write lock-down bit to serve as the at least one register-protection bit.

5. The memory device of claim 1, wherein the at least one of the memory blocks protected by the status of the register-protection bit comprises one or more contiguous memory blocks of the memory blocks.

6. The memory device of claim 1, wherein the security register further comprises a read-lock bit, the read-lock bit being programmable to a read-protection state for preventing at least one corresponding block of the memory blocks from being read, wherein the read-lock bit is configured to remain in the read-protection state until a resetting of the memory device.

7. The memory device of claim 6, wherein the read-protection state is configured to be unlocked when the at least one corresponding block that corresponds to the read-lock bit becomes a part of a write protection area.

8. The memory device of claim 1, wherein the security register further comprises a security indicator bit indicative of a status of a secured area of the memory device.

9. The memory device of claim 8, wherein the security register further comprises a security protection bit for controlling the change of contents in the secured area.

10. The memory device of claim 1, wherein the status register further includes at least one of a continuous program bit indicative of a continuous program status, a write-enable bit indicative of a write-enable status, and a write-progress bit indicative of a write-progress status.

11. A memory device comprising:
    a memory array containing a number of memory blocks;
    a status register coupled with the memory array, the status register including at least one protection bit indicative of a protection status of at least one corresponding block of the memory blocks that corresponds to the protection bit;
    a status-register write-protect bit coupled with the status register for preventing a state change of the at least one protection bit; and
    a security register coupled with the memory array and the status register, the security register including at least one register-protection bit, the register-protection bit being programmable to a memory-protection state for preventing the state change in one of the at least one protection bit of the status register and the status-register write-protect bit.

12. The memory device of claim 11, wherein the register-protection bit is configured to remain in the memory-protection state until a resetting of the memory device.

* * * * *